(12) United States Patent
Watanabe et al.

(10) Patent No.: US 6,678,687 B2
(45) Date of Patent: Jan. 13, 2004

(54) METHOD FOR CREATING AN INDEX AND METHOD FOR SEARCHING AN INDEX

(75) Inventors: Yoshiki Watanabe, Nakai-machi (JP); Hiroshi Hayata, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/972,865

(22) Filed: Oct. 10, 2001

(65) Prior Publication Data

US 2002/0059281 A1 May 16, 2002

Related U.S. Application Data

(63) Continuation of application No. 09/229,600, filed on Jan. 13, 1999.

(30) Foreign Application Priority Data

Jan. 23, 1998 (JP) .......................................... 10-0266941

(51) Int. Cl.$^7$ .............................................. G06F 17/30
(52) U.S. Cl. ................................ 707/100; 707/3; 707/4; 707/5
(58) Field of Search ........................... 707/2, 3, 6, 102, 707/107, 10

(56) References Cited

U.S. PATENT DOCUMENTS

| | | | | |
|---|---|---|---|---|
| 5,710,916 A | * | 1/1998 | Barbara et al. | 707/9 |
| 5,832,475 A | | 11/1998 | Agrawal et al. | 707/2 |
| 5,852,822 A | | 12/1998 | Srinivasan et al. | 707/4 |
| 5,857,180 A | | 1/1999 | Hallmark et al. | 707/2 |
| 6,003,036 A | * | 12/1999 | Martin | 707/102 |
| 6,058,392 A | * | 5/2000 | Sampson et al. | 707/6 |
| 6,094,649 A | * | 7/2000 | Bowen et al. | 707/3 |
| 6,141,655 A | * | 10/2000 | Johnson et al. | 707/2 |
| 6,349,308 B1 | * | 2/2002 | Whang et al. | 707/107 |
| 6,374,232 B1 | * | 4/2002 | Dageville et al. | 707/2 |
| 6,457,004 B1 | * | 9/2002 | Nishioka et al. | 707/5 |

FOREIGN PATENT DOCUMENTS

JP  A-7-244671  9/1995

OTHER PUBLICATIONS

Elmasri, Ramez et al. "Fundamentals of Database Systems," Department of Computer Science Engineering, University of Texas at Arlington, 1994, ISBN 0-8053-1748-1.*

* cited by examiner

*Primary Examiner*—Kim Vu
*Assistant Examiner*—Baoquoc N To
(74) *Attorney, Agent, or Firm*—Oliff & Berridge PLC

(57) ABSTRACT

A B+ tree index for a full-text search through documents is created fast and fast searches are implemented using the index. A B+ tree index to register sets of words serving as keys and documents containing the words is constituted of a plurality of B+ tree subindexes; a document identification number id and a word identification number iw are assigned to a document and a word to uniquely identify them; as a function to apply to documents, a hash function Hd is provided that maps a document identification number to a value indicating the position of horizontal direction of a two-dimensional array, and as a function to apply to words, a hash function Hw is provided that maps a word identification number to a value indicating the position of vertical direction of the two-dimensional array; and the occurrence of a word in a document is registered in a corresponding subindex B+ tree (Hd(id), Hw(iw)) by using values obtained by applying the hash functions to the document identification number and the word identification number, respectively. The index is searched using a value with a word identification number as a key and a document identification number concatenated.

15 Claims, 13 Drawing Sheets

| Key | Occurrence of word |
|---|---|
| 500000007 | $O_1$ |
| 500000009 | $O_2$ |
| 50000000D | $O_3$ |
| 4500000003 | $O_4$ |
| 4500000007 | $O_5$ |
| 8500000001 | $O_6$ |
| 8500000003 | $O_7$ |
| C500000004 | $O_8$ |

Fig. 5

| B + tree (0, 0) | B + tree (0, 1) | B + tree (0, 2) | B + tree (0, 3) | ... | B + tree (0, D - 1) |
|---|---|---|---|---|---|
| B + tree (1, 0) | B + tree (1, 1) | B + tree (1, 2) | B + tree (1, 3) | ... | B + tree (1, D - 1) |
| B + tree (2, 0) | B + tree (2, 1) | B + tree (2, 2) | B + tree (2, 3) | ... | B + tree (2, D - 1) |
| B + tree (3, 0) | B + tree (3, 1) | B + tree (3, 2) | B + tree (3, 3) | ... | B + tree (3, D - 1) |
| B + tree (4, 0) | B + tree (4, 1) | B + tree (4, 2) | B + tree (4, 3) | ... | B + tree (4, D - 1) |
| B + tree (5, 0) | B + tree (5, 1) | B + tree (5, 2) | B + tree (5, 3) | ... | B + tree (5, D - 1) |
| B + tree (6, 0) | B + tree (6, 1) | B + tree (6, 2) | B + tree (6, 3) | ... | B + tree (6, D - 1) |
| B + tree (7, 0) | B + tree (7, 1) | B + tree (7, 2) | B + tree (7, 3) | ... | B + tree (7, D - 1) |
| ... | ... | ... | ... | ... | ... |
| B + tree (W - 1, 0) | B + tree (W - 1, 1) | B + tree (W - 1, 2) | B + tree (W - 1, 3) | ... | B + tree (W - 1, D - 1) |

Split by document identification number

Split by word identification number

| Key | Word occurrence |
|---|---|
| 500000032 | $O_3$ |
| 50000002F | $O_2$ |
| 50000001D | $O_1$ |
| 4500000009 | $O_5$ |
| 4500000001 | $O_4$ |
| 8500000062 | $O_6$ |
| 8500000054 | $O_7$ |
| C50000003F | $O_8$ |

Fig. 15

| Key | Word occurrence |
|---:|:---:|
| 514 | $O_2$ |
| 512 | $O_1$ |
| 501 | $O_3$ |
| 4509 | $O_4$ |
| 4502 | $O_5$ |
| 8503 | $O_6$ |
| 8501 | $O_7$ |
| C501 | $O_8$ |

METHOD FOR CREATING AN INDEX AND METHOD FOR SEARCHING AN INDEX

This is a continuation of application Ser. No. 09/229,600 filed Jan. 13, 1999. The entire disclosure of the prior application(s) is hereby incorporated by reference herein in its entirety.

BACKGROUND OF THE INVENTION

1. Field of the Invention

The present invention relates to a method for creating an index fast for a full-text search through documents and a method for implementing fast searches by use of the index, and more particularly to the structure of the index.

2. Description of the Prior Art

A method using a data structure called a signature file is available for a full-text search through large volumes of documents. According to the method disclosed in Japanese Published Unexamined Patent Application No. Hei 7-244671, an index is formed to represent the occurrence of characters in documents by bits. This method allows relatively fast searches independently of the number of stored documents.

However, since one bit is assigned to several different words, there is a possibility that a document containing words not specified is searched, posing a problem that a correct search cannot be performed. Also, the complex algorithm of index creation and search has made it difficult to implement fast full-text searches on existing database management systems.

As a solution to such a problem, in the literature "Compression and Fast Indexing for Multi-Gigabyte Text Database", a method is proposed that implements the functions of a fast full-text search by using indexing methods such as a hash table and B+ tree, as offered by general database management systems. According to this method, an identification number is assigned to a word used as a key and a document used as a value of an index, respectively, and they are compressed before being stored.

This reduces the number of disk pages to be read that are required for searches, enabling fast searches. Also, since different identification numbers are assigned to different words, searches can be performed correctly. This literature shows that about seven hundred thousands of documents can be searched fast.

However, the method described in the above-mentioned literature has a problem that high performance cannot be obtained because the performance of index creation and update processing is not taken into account. Particularly, confirmation processing for avoiding the duplicate registration of an identical document for a certain word during updating cannot be implemented efficiently because it must be performed by repetitive processing on a collection of document identification numbers.

Also, when there are several millions of target documents as in a full-text search through Internet's WWW pages, addition to the index and search processing cannot be performed efficiently even by the method described in the above-mentioned literature because a B+ tree becomes as large as tens of gigabytes.

There are two reasons for this. First, in order to add or search for a set of a word and a document with respect to the B+ tree, a hard disk must be accessed as many times as the height of the tree plus one. Second, if the B+ tree becomes huge, the effect of caching disk contents to a memory would not be obtained and almost all accesses to the hard disk would involve actual reading of data from the hard disk.

For example, if the overall size of a B+ tree is 10 GB, the size of each node of the B+ tree is 8 KB, and the number of branches of each node is 500, then the height (=log 500 (10 GB/8 KB)) of the B+ tree minus 1 is 2.16, indicating that the disk must be accessed two to three times on the average to add or search for a set of a word and a document. Since it takes several tens of milliseconds to several hundreds of milliseconds to access a hard disk once, it would take from 0.1 to 1 second to add or search for a set of a word and a document. Accordingly, if 100 different words are contained in one document, 10 to 100 seconds would be required to register one document.

For these reasons, as the number of data items stored in a B+ tree increases, the B+ tree becomes taller and larger and the number of pages to be accessed increases, so that time required for storage and search becomes longer. For example, as shown in FIG. 17, which shows a trend of change of storage time, storage time increases significantly as the number of documents stored increases.

SUMMARY OF THE INVENTION

The present invention has been made in consideration of the above-mentioned conventional circumstances, and it is an object of the present invention to offer a method for creating fast an index for a full-text search through a huge number of documents, for example.

Another object of the present invention is to offer a method for implementing fast searches by using an index thus created.

Specifically, the present invention uses B+ tree index keys with a word identification number followed by a document identification number, whereby the occurrence of a certain word in a given document is made possible by one search through the B+ tree index.

In this case, however, if the index is to be managed by a single B+ tree, the B+ tree would become huge when large volumes of documents are stored, so that, in an attempt to add one document, as many pages as different words contained in the document might have to be updated in the worst case.

To avoid this, the B+ tree index is split to a plurality of subindexes by hash values obtained by applying a certain hash function to word identification numbers and hash values obtained by applying another hash function to document identification numbers and the subindexes are placed in a two-dimensional array. By collectively performing registration for the same hash values of document identification numbers during creation or updating of an index, the number of pages to write to has been reduced and processing efficiency has been improved.

Also, an AND or OR search of a plurality of words is performed in such a way that groups are formed by the hash values of word identification numbers and the B+ trees grouped by the hash values of document identification numbers are collectively searched on a group basis, whereby a hit ratio of page cache during page reading has been improved, thereby achieving higher processing efficiency.

That is, this invention provides a method for creating an index in which keys (e.g., words) and values (e.g., one document containing the words) are associated to search for a value from a specified key, wherein the index to register sets of keys and values are constituted, for example, of a plurality of subindexes of B+ tree structure, each of which is stored in a two-dimensional array position referenced by a value determined by applying a predetermined function to a value to be registered and a value determined by applying a predetermined function to a key.

More specifically, the present invention assigns a document identification number and a word identification number to a document and a word, respectively, to uniquely identify them, provides, as a function to apply to documents, a hash function that maps a document identification number to a value indicating the position of one direction of a two-dimensional array, and as a function to apply to words, a hash function that maps a word identification number to a value indicating the position of another direction of the two-dimensional array, and registers the occurrence of a word in a document in a corresponding subindex by using values obtained by applying the hash functions to the document identification number and the word identification number, respectively.

Also, the present invention assigns a word identification number to a word to uniquely identify it, provides, as a function to apply to the occurrence of word, a hash function that maps the occurrence count or frequency of the word in a document to a value indicating the position of one direction of a two-dimensional array, and as a function to apply to words, a hash function that maps a word identification number to a value indicating the position of another direction of the two-dimensional array, and registers the occurrence of a word in a document in a corresponding subindex by using values obtained by applying the hash functions to the occurrence count of the word and the word identification number, respectively.

In the above registration, when the occurrences of words in a plurality of documents are registered as a single unit, groups are formed by the values determined by applying a hash function to the document identification numbers (or the occurrence count or frequency of the words) of the documents, and the occurrences of words are registered on a group basis.

Furthermore, in the above registration, when the occurrences of all words in documents collected into one group are registered, the occurrences of words are grouped by the values obtained by applying a hash function to the words so that they are registered on a group basis.

In the above registration, a page cache capable of storing at least one subindex provided in the main storage is used.

The present invention provides a search method for obtaining a corresponding document name from a word serving as a key by using an index with document names associated with words contained in the documents, wherein document identification numbers and word identification numbers are assigned to document names and words, respectively, to uniquely identify them, and a value with a document identification number concatenated with a word identification number is used as the key.

More specifically, the present invention provides a search method which constitutes an index with document names associated with words contained in the documents by a plurality of subindexes, assigns document identification numbers and word identification numbers to document names and words, respectively, to uniquely identify them, and obtains a corresponding document name from a word serving as a key by using an index registered in a subindex in a two-dimensional array position referenced by a value determined by applying a hash function to a document identification number and a word identification number, wherein a search by a plurality of words is performed in such a way that groups are formed by the values obtained by applying a hash function to the identification numbers of the words and the subindexes are searched on a group basis.

Also, the present invention provides a search method which constitutes an index with document names associated with words contained in the documents by a plurality of subindexes, assigns document identification numbers and word identification numbers to document names and words, respectively, to uniquely identify them, and obtains a corresponding document name from a word serving as a key by using an index registered in a subindex in a two-dimensional array position referenced by a value determined by applying hash functions to document identification numbers and word identification numbers, wherein an AND or OR search of a plurality of words is performed in such a way that subindexes for documents grouped by the values obtained by applying a hash function to document identification numbers are searched for the occurrence of each word and the AND or OR operation on the search results is performed.

BRIEF DESCRIPTION OF THE DRAWINGS

FIG. 5 is a diagram showing the structure of a B+tree index array.

FIG. 15 is a diagram showing part of the contents of a B+ tree according to the third embodiment.

DESCRIPTION OF THE PREFERRED EMBODIMENTS

Embodiments of the present invention will be described with reference to the accompanying drawings.

Figure 1:
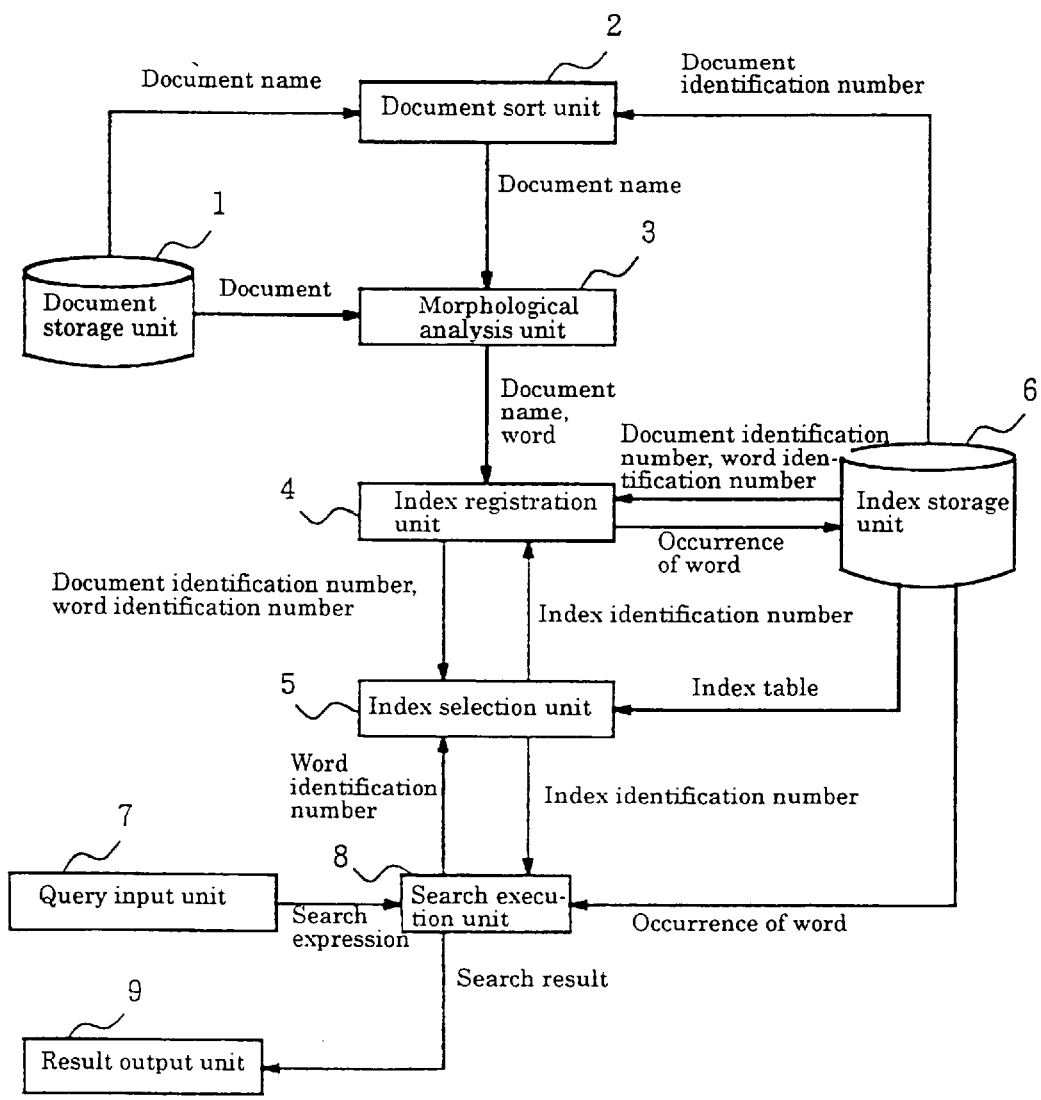
FIG. 1 shows an example of the configuration of an apparatus according to one embodiment of the present invention.

FIG. 1 shows an example of the configuration of an apparatus for executing a method according to the present invention. The apparatus is configured to execute a program for implementing the present invention using computer hardware resources.

A document storage portion 1 is on an external memory such as a hard disk drive. In the document storage portion 1 are stored the documents to be registered or searched, along with their document names.

A document sort portion 2 sorts the names of documents to be registered to an index so that the same values obtained by applying a predefined hash function to document identification numbers are grouped.

A morphological analysis portion 3 analyzes the full text of a specified document and isolates words.

An index registration portion 4 obtains a given document name and word identification number and registers the occurrence of the word in a B+ tree structure selected by the function of an index selection portion 5 by using the word identification number and document identification number as key.

An index storage portion 6 is on an external memory such as a hard disk drive. The index storage portion 6 stores a B+ tree in a two-dimensional array of a predetermined size (D×W in this example, where D and W are integers of 1 or greater). The index storage portion 6 also stores the correspondences between document names and document identification numbers and between words and word identification numbers.

An index selection portion 5 applies predetermined hash functions to a given document identification number and a given word identification number, respectively, and using a value obtained as a result, selects the identification number of the B+ tree to register the occurrence of the word from an index table stored in the index storage portion 6.

Herein, hash functions H applied to document identification numbers and word identification numbers used in the document sort portion 2 and the index selection portion 5 are defined so that they satisfy the following relations, respectively: $0 \leq Hd(id) < D$ and $0 \leq Hw(iw) < W$, where id is an integer indicating a document identification number and iw is an integer indicating a word identification number.

A query input portion 7 accepts search requests from users and generates a search expression that couples words with AND or OR.

A search execution portion 8, to perform search processing, obtains the B+ tree to be searched by the function of the index selection portion 5 from the identification number of a word contained in a given search expression.

A result output portion 9 passes search results obtained by the search execution portion 8 to the user by a display or other means.

Figure 2:
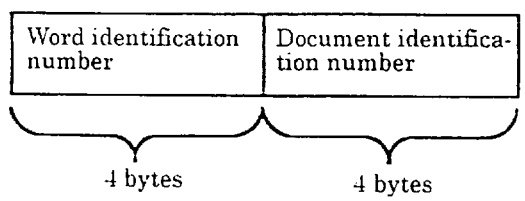
FIG. 2 is a diagram showing the structure of key according to the first embodiment.

FIG. 2 shows an example of a key structure of B+ tree stored in the index storage portion 6.

The B+ tree key consists of a word identification number followed by a document identification number. In this example, an area of four bytes is assigned to each of a word identification number and a document identification number.

By this arrangement, in a search to obtain a document containing a certain word, for all B+ trees containing the occurrence of the word, by performing a search in the range from a value with the word identification number of the word followed by a minimum document identification number (0 in this example) to a value with the word identification number of the word followed by a maximum document identification number (FFFFFFFF (hexadecimal) in this example), all the occurrences of the word can be obtained in ascending order by document identification number.

Figures 3, 4:
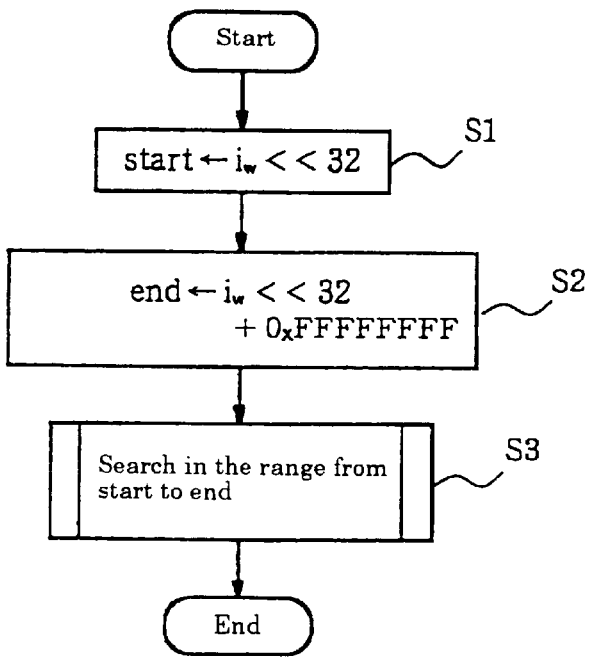
FIG. 3 is a flowchart showing the procedure for searching for the occurrence of a word.
FIG. 4 is a diagram showing part of the contents of a B+ tree.

Namely, in this processing whose procedure is as shown in FIG. 3, a search is performed in the range from a start point, a value resulting from shifting the key in FIG. 2 32 bits to the left (step S1), to an end point, a value resulting from shifting the key in FIG. 2 32 bits to the left plus FFFFFFFF (step S3).

In FIG. 3, the symbol "<<" denotes an operation that shifts bits to the left.

When the occurrence of a certain word in a given document is to be searched for, a value with the identification number of the word concatenated with the identification number of the document is used as a key to search for a perfect match so that the occurrence of the word can be obtained.

For example, assume that the status of part of B+ tree is as shown in FIG. 4 when the occurrences of a word on several documents have been registered. When documents containing a word having a word identification number of 45 (hexadecimal) are searched, the occurrences (04 and 05) of the word are obtained by searching for words in the range of key values 4500000000 (hexadecimal) to 45 FFFFFFFF (hexadecimal). To see if a word having a word identification number of 45 (hexadecimal) is contained in a document having a document identification number of 7, by using 4500000007 (hexadecimal) as a key value and searching for a word matching the key value, the occurrence (05) of the word can be obtained.

FIG. 5 shows a storage structure of B+ tree in the index storage portion 6.

The B+ tree has a structure in which D×W subindexes are stored in a D-by-W two-dimensional array, and the occurrence of a word having id as a document identification number and Iw as a word identification number is stored in the B+ tree correspondingly to a subindex of B+ tree (Hw(iw), Hd(id)).

Figure 6:
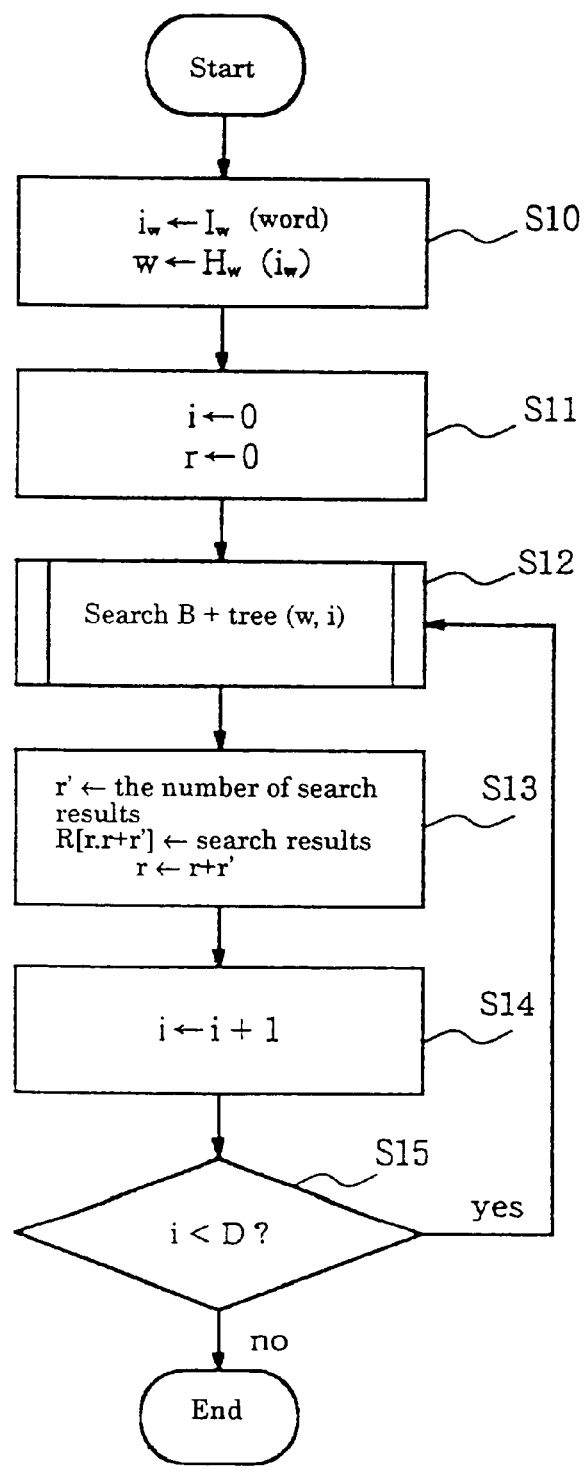
FIG. 6 shows the procedure for searching for the occurrence of a word.

Accordingly, to search for the occurrence of a word having a word identification number of iw, processing shown in FIG. 3 is performed for a B+ tree selected according to the procedure shown in FIG. 6.

FIG. 6 shows the procedure for searching documents for a specified word.

In this processing, the word identification number Iw of a given word is assigned to iw and a value obtained by applying a hash function Hw with the Iw as an argument is assigned to w (step S10). Variables i and r are initialized to 0 (step S11), B+ tree (w, i) is repeatedly searched for the word (step S12) while incrementing i one by one (step S14) until i becomes equal to D (step S15), and the results are added to an array R (step S13).

By this processing, searches can be performed for B+ tree subindexes stored in one row of the two-dimensional array shown in FIG. 5. Since the occurrence of a target word is not contained in other B+ trees, the word will be contained only in a document found by this processing.

Since the B+ trees to be searched are limited and each B+ tree is used in order, a hit ratio of a cache storing the subindexes to be searched can be improved, so that searches can be performed efficiently. In search processing, at least one B+ tree subindex is placed in a main storage cache used by the search execution portion 8.

Figure 7:
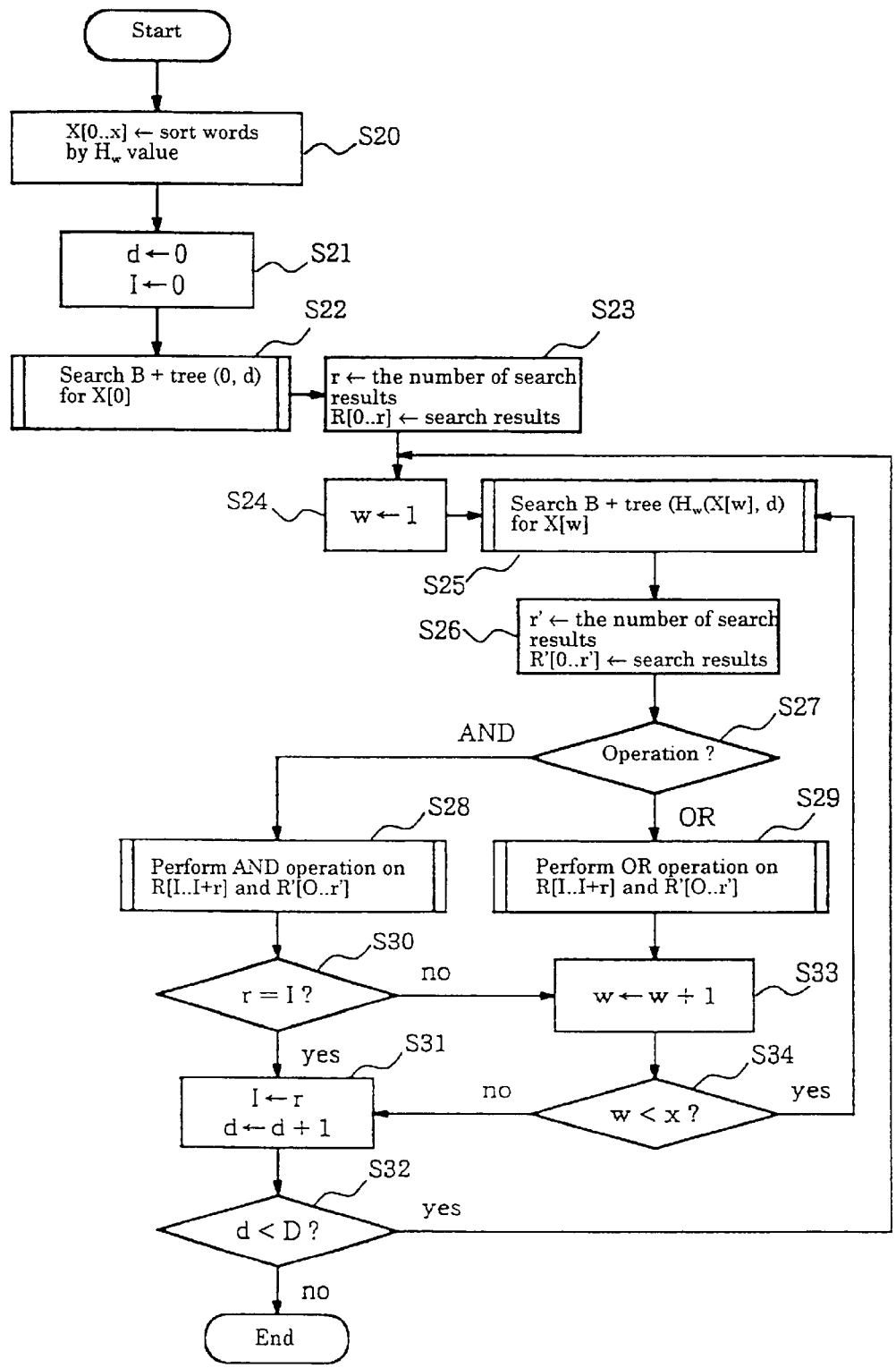
FIG. 7 is a flowchart showing the procedure for a search by a plurality of words.

FIG. 7 shows the procedure for performing searches under AND or OR conditions for a plurality of words.

This processing, called when an AND or OR operation on a plurality of words is specified, sorts given words by the order of values obtained by applying a hash function Hw(iw) to the identification numbers of the words and stores the results in an array X (step S20). By this processing, in the subsequent searches, searches for the same B+ tree subindexes are continuously performed, so that a hit ratio of a cache storing the subindexes can be improved.

Next, the values of a variable d specifying columns of the two-dimensional array shown in FIG. 5 and a variable I indicating the determined number of search results are initialized to zero (step S21), and B+ tree (0, d) is searched for the occurrence of a word of word identification number X[0] (step S22). The search processing is performed according to the procedure shown in FIG. 3, the number of search results is assigned to a variable r, and the search results are assigned to an array R[0 . . . r] (step S23).

Then, the value of a variable w is initialized to 1 (step S24), and the following processing is repeatedly performed while incrementing w one by one. Namely, subindexes B+ tree (Hw(X[0], d) are selected in the vertical direction of the two-dimensional array and AND or OR operations are performed while executing searches.

This processing is performed in the following procedure. Subindex B+ tree (Hw(X[0], d) is searched for the occurrence of a word of X[w] according to the processing of FIG. 3 (step S25), and the number of the results and the results are assigned to r' and R'[0 . . . r'], respectively (step S26).

Next, whether to perform an AND or OR operation is judged (step S27), and according to the judgment result, an AND or OR operation is performed for R[I . . . I+r] and R'[0 . . . r'] (steps S28 and S29). AND and OR operations are performed according to the procedures described later based on FIGS. 8 and 9, respectively.

For an AND operation (step S28), if the result of the operation is r=I (the occurrence of a pertinent word was not found as a result of the operation) (step S30), d is incremented by one (step S31), and if d is smaller than D (unprocessed columns remain in the two-dimensional array) (step S32), a B+ tree subindex of the next column is searched (step S24). On the other hand, if r is not equal to I (step S30), w is incremented by one (step S33) to confirm the existence of the next word (step S34) and a search operation on the next word is performed (step S25).

For an OR operation (step S29), w is incremented by one after termination of the operation (step S33) to confirm the existence of the next word (step S34), and a search operation on the next word is performed (step S25).

Figure 8:
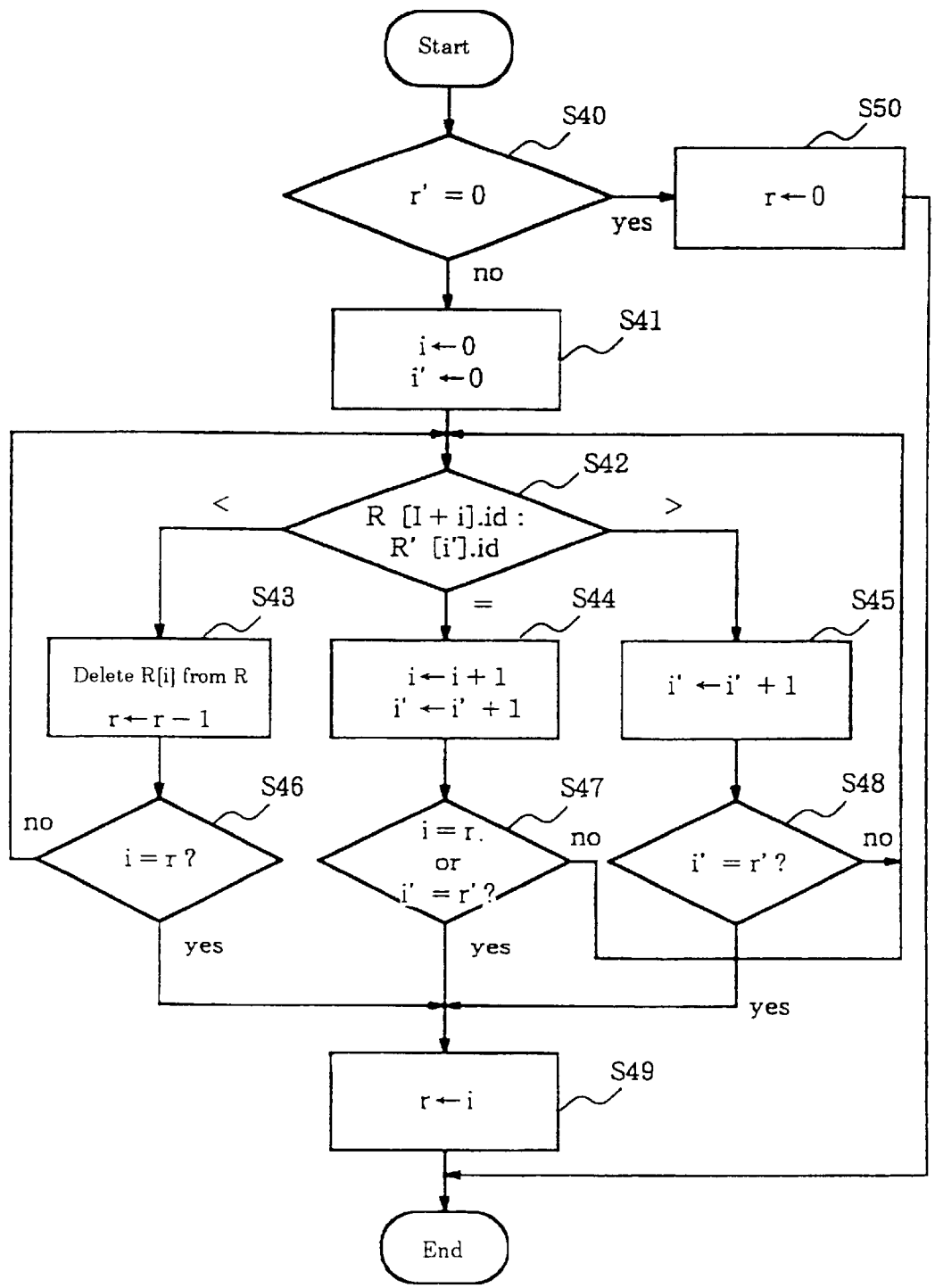
FIG. 8 is a flowchart showing the procedure for processing of an AND operation.

FIG. 8 shows the procedure of processing of an AND operation (step S28).

In this processing, of the occurrences of words contained in the array R [I . . . I+r], only the occurrences of words of the same document contained in the array R'[0 . . . r'] are left in the array R.

To check whether the occurrences are contained in the both arrays, a document identification numbers R[i].id and a document identification number R'[i'].id are compared (step S42) while increasing i from 0 to r and i' from 0 to r' (steps S41, and S46 to S48).

When R[i].id <R'[i'].id, since the occurrence of a word for a document of the same document identification number as R[i].id is not contained in the array R', R[i] is deleted from the array R (step S43). When R[i] id=R'[i].id, since the array R'[i'] indicates the occurrence of a word for a document of the same document identification number as R[i].id, the occurrence is left in the array B and processing for the occurrence of the next word is performed by incrementing i and i' by one, respectively (step S44). When R[i].id >R'[i'] .id, since the occurrence of a word for the same document as R[i] may be contained in R'[i'+1 . . . r'], i' is incremented by one to perform comparison processing again (step S45).

The above processing is repeated until i reaches the end of the array R or i' reaches the end of the array R', and terminates by assigning the value of i to r (step S49), which causes all the occurrences of words for documents of document identification numbers greater than the document identification number of the document for the word occurrence of R'[r'−1] to be deleted from the latter portion of the array R.

If search result is 0 (steps S40 and S50), processing terminates immediately.

Figure 9:
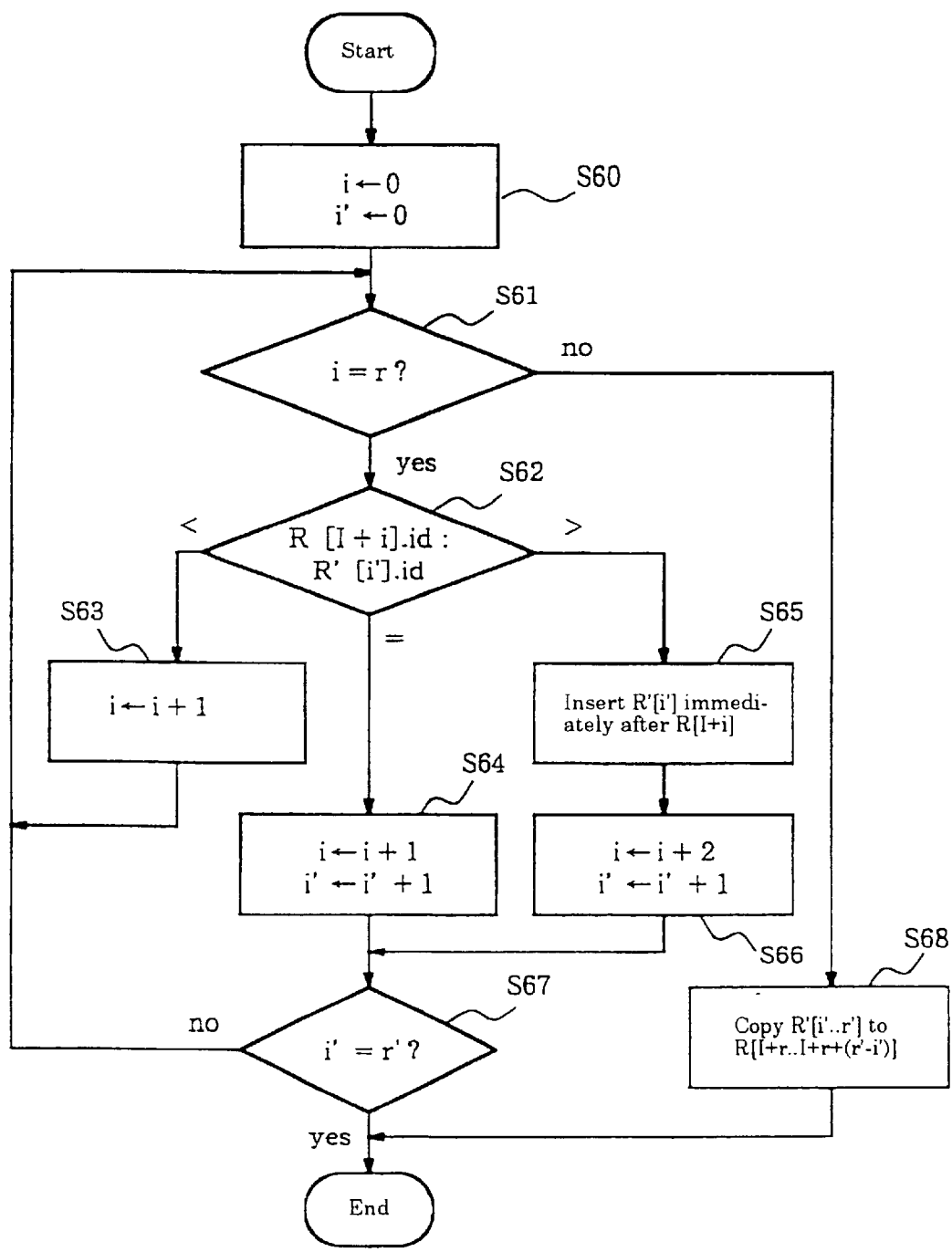
FIG. 9 shows the procedure for processing of an OR operation.

FIG. 9 shows the procedure of processing (step S29) of the above OR operation.

In this processing, of the occurrences of words contained in the array R' [0 . . . r'], the occurrences of words of the same document not contained in the array R [I . . . I+r] are added to the array R.

This judgment is made in such a way that a document identification number R[i].id and a document identification number R'[i'].id are compared (step S62) while increasing i from 0 to r and i' from 0 to r' (steps S60, and S63 to S67).

When R[i].id<R'[i'].id, since the occurrence of a word for a document of the same document identification number as R[i].id is not contained in the array R', i is incremented by one to perform the next comparison (step S63). When R[i].id=R'[i'].id, since the occurrences of these words are for the same document, both i and i' are incremented by one to return to comparison processing (step S64).

When R[i].id>R'[i'].id, since the occurrence of a word for a document of the same document identification number as R'[i'].id is not contained in the array R[I . . . I+r], the word occurrence R'[i'] is inserted immediately after R[i] (step S65) and i is incremented by two and i' by one to perform the next comparison (step S66).

A check is made to see if i=r (step S61) prior to the above comparison processing, and if it is true, which indicates that processing for all elements of R[I . . . I+r] has terminated, all the occurrences of unprocessed words in the array R' are added to the end of the array R and processing terminates (step S68).

Figure 10:
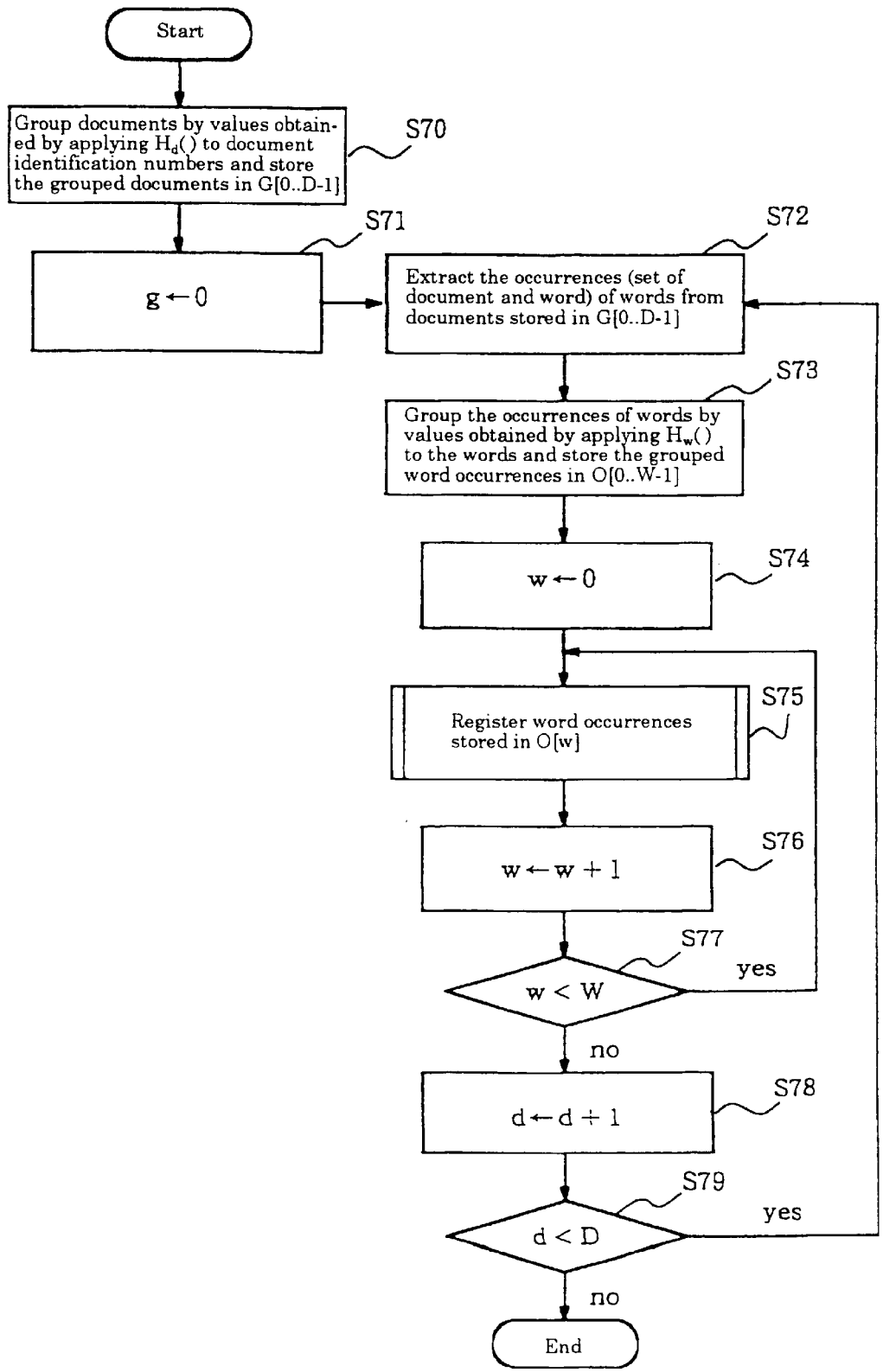
FIG. 10 shows the procedure for collectively registering a plurality of documents.

FIG. 10 shows the procedure for collectively registering the occurrences of words of a plurality of documents.

In this processing, the documents are grouped by values obtained by applying a hash function Hd to document identification numbers and the grouped documents are stored in an array G on a group basis (step S70). Next, a variable g is initialized (step S71), and for each of the groups of documents stored in the array G, the occurrences (a set of document and word) of words are fetched from all documents belonging to it (step S72) and are grouped by values obtained by applying a hash function Hw to the identification numbers of the words, and the occurrences of the grouped words are stored in an array O on a group basis (step S73).

While incrementing the variable w by one (steps S74, S76, and S77), for each of the groups of documents stored in the array G, processing (described later in FIG. 11) to register the occurrences of words belonging to it is performed (step S75) and, further, while incrementing the variable d one by one (steps S78 and S79), the above processing is repeated.

By the above processing, the occurrences of words are sequentially stored in B+ tree subindexes arranged from the upper left corner of the array shown in FIG. 5 downward. Since storage to a B+ tree subindex at the bottom is followed by top-down, sequential storage to the B+ tree subindexes just to the right, a hit ratio of page cache can be improved without a plurality of B+ tree subindexes being alternately referenced.

Furthermore, if the main storage has a sufficient area to store the contents of one B+ tree subindex, since all storage processing can be performed in the main storage, storage processing can be performed very quickly.

Figure 11:
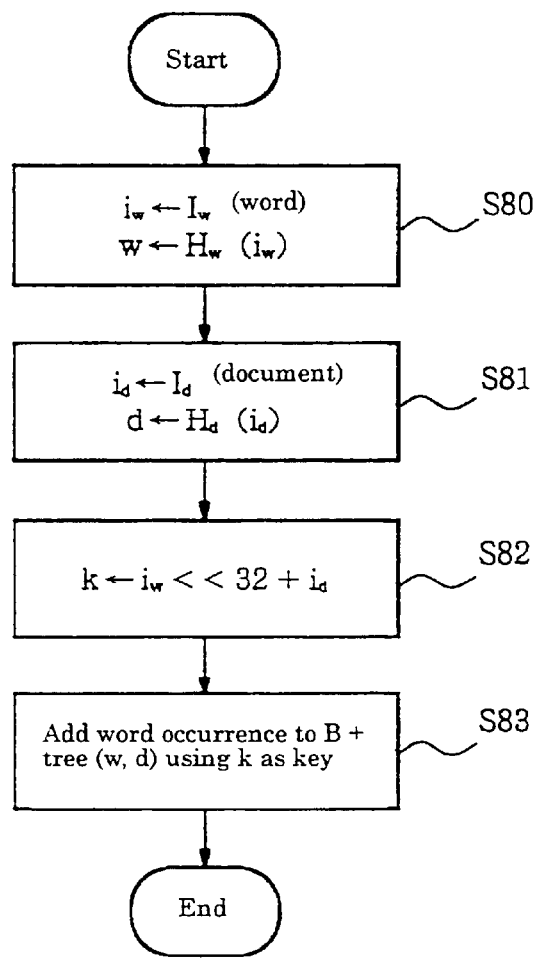
FIG. 11 shows the procedure for registering the occurrence of a certain word.

FIG. 11 shows the procedure for registering the occurrence of a certain word in a document.

In this processing, for a word and a document, the identification numbers iw and id thereof are obtained, and values obtained by applying hash functions Hw(iw) and Hd(id) to them, respectively, are stored in variables w and d (steps S80 and S81).

A value resulting from shifting the value of iw 32 bits to the left plus the value of id is assigned to a variable k (step S82), and the occurrence of the word is registered in the B+ tree (w, d) subindex of the array shown in FIG. 5 by using k as a key (step S83).

Use of an index structured as described above and an array having a split count of D=64 and W=64 makes it possible to reduce the height of a tree to about two-thirds that at the use of a conventional index by one B+ tree.

Figure 16:
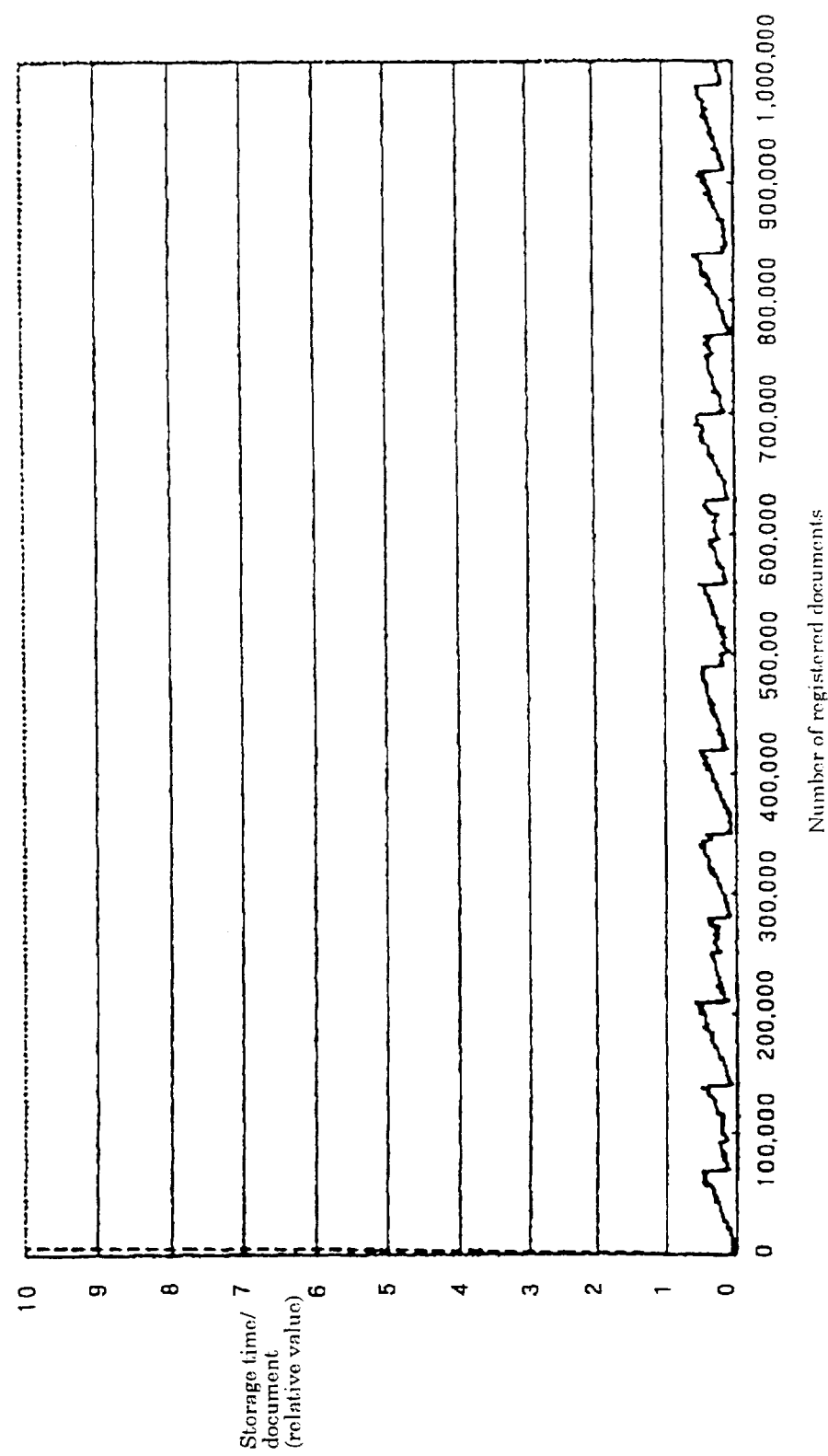
FIG. 16 is a graph showing the transition of time required to register a new document against the number of registered documents when the first embodiment of the present invention is used.
Figure 17:
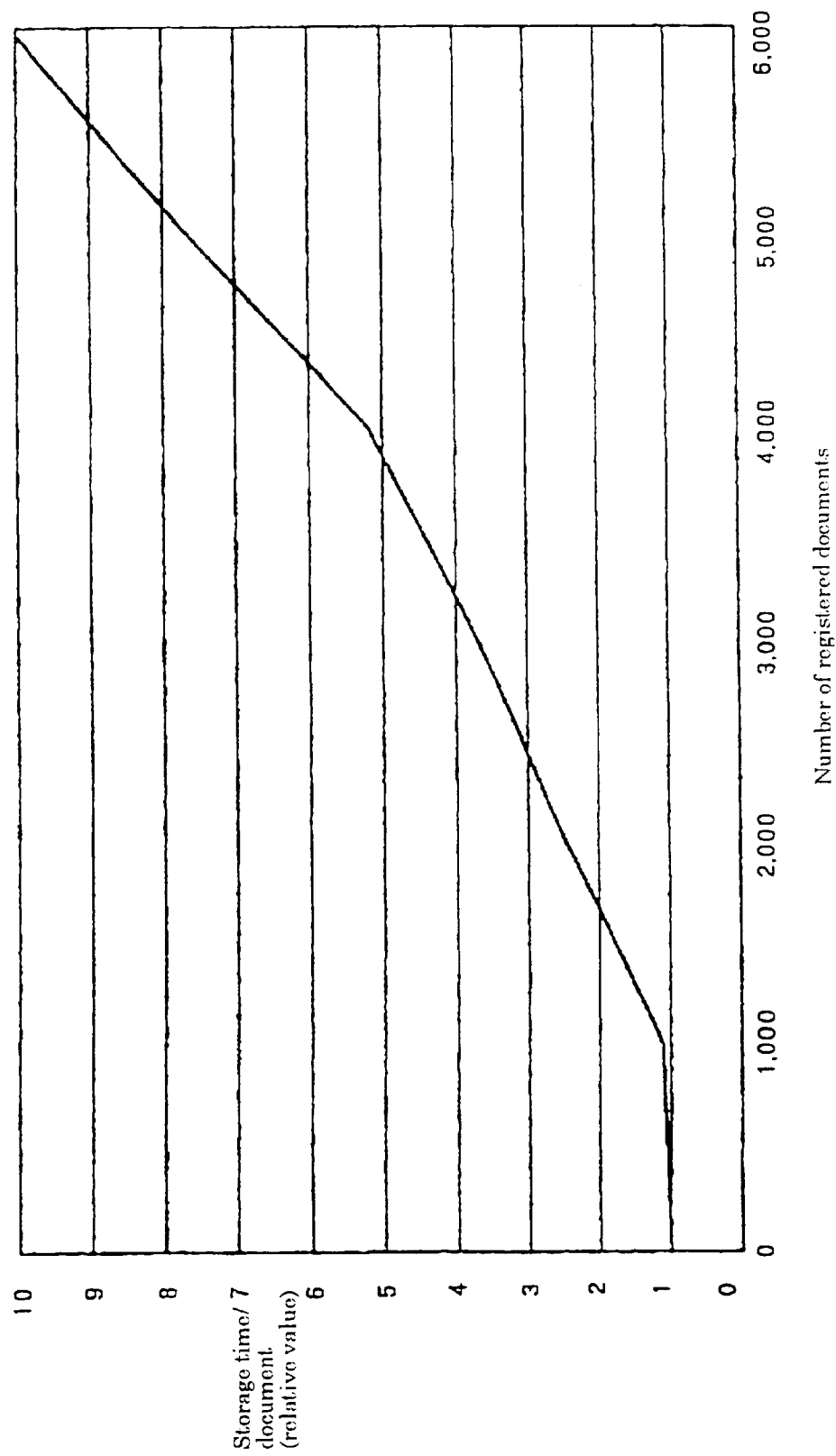
FIG. 17 is a graph showing the transition of time required to register a new document against the number of registered documents when the prior art is used.

By this arrangement, performance at document storage can be improved as shown by the solid line in FIG. 16 from the previous status shown in FIG. 17, for example. The dashed line in FIG. 16 indicates the transition of storage time by the prior art shown in FIG. 17. In addition to storage performance, search performance can be improved by about 1.5 times.

Figure 12:
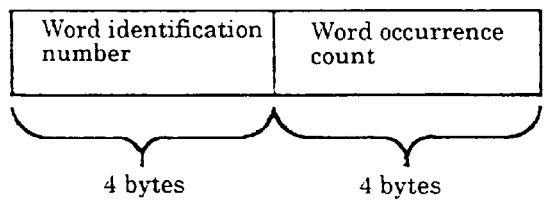
FIG. 12 is a diagram showing the structure of key according to the second embodiment.

FIG. 12, as a second embodiment of the present invention, shows the structure of key when values obtained by applying a certain function to the occurrence count of words are used to split a B+ tree index in vertical direction. A key of this embodiment consists of a word identification number followed by an integer indicating its occurrence count. An area of four bytes is assigned to each of a word identification number and an occurrence count.

Figures 13, 14:
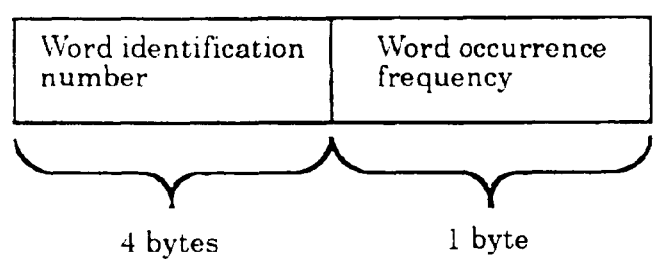
FIG. 13 is a diagram showing part of the contents of a B+ tree according to the second embodiment.
FIG. 14 is a diagram showing the structure of a key according to the third embodiment.

FIG. 13 shows the occurrences of words registered in a B+ tree by using the key structure shown in FIG. 12.

As shown in the figure, a plurality of different occurrences of the same word are arranged in descending order by the number of word occurrences. This helps to fetch search results in descending order by the number of word occurrences in search processing.

The procedure for searching for the occurrence of word in the second embodiment is the same as that in the first embodiment shown in FIG. 6. The procedure for registering the occurrences of words can be implemented by replacing the processing (step S70) to group documents by document identification numbers in the processing procedure shown in FIG. 10 by the processing to group the occurrences of words by use of the occurrence count of words and the processing (steps S81 and S82) to generate key values using document identification numbers in the processing procedure in FIG. 11 by the processing to generate key values using the occurrence count of words.

FIG. 14, as a third embodiment of the present invention, shows the structure of a key when values obtained by applying a certain function to the occurrence frequency of words are used to split a B+ tree in vertical direction. A key of this embodiment consists of a word identification number followed by an integer indicating its occurrence frequency. An area of four bytes is assigned to a word identification number and an area of one byte to an occurrence frequency.

The occurrence frequency of a word is represented by the number of occurrences of the word in the document divided by the total number of words in the document, multiplied by 100.

FIG. 15 shows the occurrences of words registered in a B+ tree by using the key structure shown in FIG. 14.

As shown in the figure, a plurality of different occurrences of the same word are arranged in descending order by the occurrence frequency of words. This helps to fetch search results in descending order by the occurrence frequency of words in search processing.

The procedure for searching for the occurrence of word in the third embodiment is the same as that in the first embodiment shown in FIG. 6. The procedure for registering the occurrences of words can be implemented by replacing the processing (step S70) to group documents by document identification numbers in the processing procedure shown in FIG. 10 by the processing to group the occurrences of words by use of the occurrence frequency of words and the processing (steps S81 and S82) to generate key values using document identification numbers in the processing procedure in FIG. 11 by the processing to generate key values using the occurrence frequency of words.

As described above, according to the present invention, the index to register a set of key and value is comprised of a plurality of subindexes, each of which is stored in a two-dimensional array position referenced by a value determined by applying a predetermined function such as a hash function to a value to be registered and a value determined by applying a predetermined function such as a hash function to a key. As a key for a search operation, a word identification number followed by a document identification number, a word occurrence count, or a word occurrence frequency is used, so that the number of update pages and read pages required for storage and searches with respect to large volumes of documents can be reduced, enabling high-speed processing.

What is claimed is:

1. A method for creating an index in which keys are associated to search for a value from a specified key, comprising:

constituting the index to register sets of keys and values by providing a B+ tree index that is split to a plurality of subindexes; and storing each of the subindexes in a two-dimensional array position referenced in a first dimension by a value determined by applying a predetermined function to a value to be registered and referenced in a second dimension by a value determined by applying a predetermined function to a key;

wherein a word is used as the key and one document containing the word is used as the value;

wherein a document identification number and a word identification number are assigned to the document and the word, respectively, to uniquely identify them;

wherein, as the function to apply to documents, a hash function is provided that maps the document identification number to the value indicating a position of one dimension of the two-dimensional array, and as the function to apply to words, a hash function is provided that maps a word identification number to a value indicating a position of another dimension of the two-dimensional array; and wherein an occurrence of a word in a document is registered in a corresponding subindex by using values obtained by applying the hash functions.

2. A method for creating an index according to claim 1, wherein B+ tree structure is used as the subindexes.

3. A method for creating an index according to claim 1, wherein, when the occurrences of words in a plurality of documents are registered as a single unit, groups are formed by the values obtained by applying a hash function to the document identification numbers of the documents so that the occurrences of words are registered on a group basis.

4. A method for creating an index according to claim 1, wherein a word identification number is assigned to a word to uniquely identify it;

wherein, as a function to apply to the occurrence of a word, a hash function is provided that maps the occurrence count of the word in a document to a value indicating the position of one direction of a two-dimensional array;

wherein, as a function to apply to a word, a hash function is provided that maps a word identification number to a value indicating the position of another direction of the two-dimensional array; and wherein the occurrence of a word in a document is stored in a corresponding subindex by using values obtained by applying the hash functions to the occurrence count of the word and the word identification number, respectively.

5. A method for creating an index according to claim 4, wherein, when the occurrences of words in a plurality of documents are registered as a single unit, groups are formed by the values obtained by applying a hash function to the occurrence count of the words so that the occurrences of words are registered on a group basis.

6. A method for creating an index according to claim 1, wherein a word identification number is assigned to a word to uniquely identify it;

wherein, as a function to apply to the occurrence of a word, a hash function is provided that maps the occurrence frequency of the word in a document to a value indicating the position of one direction of a two dimensional array;

wherein, as a function to apply to a word, a hash function is provided that maps a word identification number to a value indicating the position of another direction of the two-dimensional array; and wherein the occurrence of a word in a document is stored in a corresponding subindex by using values obtained by applying the hash functions to the occurrence frequency of the word and the word identification number, respectively.

7. A method for creating an index according to claim 6, wherein, when the occurrences of words in a plurality of documents are registered as a single unit, groups are formed by the values obtained by applying a hash function to the occurrence frequency of the words so that the occurrences of words are registered on a group basis.

8. A method for creating an index according to claim 3, wherein, when the occurrences of all words in documents collected into one group are registered, the occurrences of words are grouped by the values obtained by applying a hash function to the words so that they are registered on a group basis.

9. A method for creating an index according to claim 8, wherein a page cache capable of storing at least one subindex provided in the main storage is used.

10. A method for searching an index which obtains a corresponding document name from a word serving as a key by using an index having a B+ tree index that is split into a plurality of subindexes with document names associated with words contained in the documents, wherein document identification numbers and word identification numbers are assigned to document names and words, respectively, to uniquely identify them, and wherein a value with a document identification number concatenated with a word identification number is used as the key;

wherein, as a function to apply to documents, a hash function is provided that maps the document identification number to a value indicating a position of one dimension of a two-dimensional array, and as a function to apply to words, a hash function is provided that maps the word identification number to a value indicating a position of another dimension of the two-dimensional array; and wherein the occurrence of a word in a document is registered in a corresponding subindex by using values obtained by applying the hash functions to the document identification number and the word identification number, respectively.

11. A method for searching an index which constitutes an index with document names associated with words contained in the documents by providing a B+ tree index that is split to a plurality of subindexes, assigns document identification numbers and word identification numbers to document names and words, respectively, to uniquely identify them, and obtains a corresponding document name from a word serving as a key by using an index registered in a subindex in a two-dimensional array position referenced by a value determined by applying a hash function to a document identification number and a value determined by applying a hash function to a word identification number, wherein a search by a plurality of words is performed in such a way that groups are formed by the values obtained by applying a hash function to the identification numbers of the words and the subindexes are searched on a group basis;

wherein a word is used as a key and one document containing the word is used as a value;

wherein a document identification number and a word identification number are assigned to a document and a word, respectively, to uniquely identify them;

wherein, as a function to apply to documents, a hash function is provided that maps a document identification number to a value indicating the position of one direction of a two-dimensional array, and as a function to apply to words, a hash function is provided that maps a word identification number to a value indicating the position of another direction of the two-dimensional array; and wherein an occurrence of a word in a document is registered in a corresponding subindex by using values obtained by applying the hash functions to the document identification number and the word identification number, respectively.

12. A method for searching an index which constitutes an index with document names associated with words contained in the documents by providing a B+ tree index that is split to a plurality of subindexes, assigns document identification numbers and word identification numbers to document names and words, respectively, to uniquely identify them, and obtains a corresponding document name from a word serving as a key by using an index registered in a subindex in a two-dimensional array position referenced by a value determined by applying a hash function to a document identification number and a value determined by applying a hash function to a word identification number, wherein an AND or OR search of a plurality of words is performed in such a way that subindexes for documents grouped by the values obtained by applying a hash function to document identification numbers are searched for the occurrence of each word and the AND or OR operation on the search results is performed;

wherein a word is used as the key and one document containing the word is used as the value;

wherein a document identification number and a word identification number are assigned to a document and a word, respectively, to uniquely identify them;

wherein, as a function to apply to documents, a hash function is provided that maps a document identification number to a value indicating the position of one direction of a two-dimensional array, and as a function to apply to words, a hash function is provided that maps a word identification number to a value indicating the position of another direction of the two-dimensional array; and wherein an occurrence of a word in a document is registered in a corresponding subindex by using values obtained by applying the hash functions to the document identification number and the word identification number, respectively.

13. An apparatus for creating an index with keys and values associated, to search for a value from a specified key, comprising:

index storing unit that stores an index constituted by providing a B+ tree index that is split to a plurality of subindexes;

first function application unit that calculates a first value by applying a predetermined function to a value to be registered;

second function application unit that calculates a second value by applying a predetermined function to a key value; and storing unit that stores a set of said key and said value to be registered in a subindex within said index storing unit in a two-dimensional array position determined in accordance with said first value and second value calculated;

wherein a word is used as the key and one document containing the word is used as the value to be registered;

wherein a document identification number and a word identification number are assigned to a document and a word, respectively, to uniquely identify them;

wherein, as a function to apply to documents, a hash function is provided that maps the document identification number to a value indicating a position of one dimension of a two-dimensional array, and as a function to apply to words, a hash function is provided that maps the word identification number to a value indicating position of another dimension of the two-dimensional array; and wherein an occurrence of a word in a document is registered in a corresponding subindex by using values obtained by applying the hash functions to the document identification number and the word identification number, respectively.

14. A storage medium storing a program for having a computer create an index with keys and values associated, to search for a value from a specified key, in a format readable from the computer for execution, wherein said program constitutes an index to register sets of keys and values by providing a B+ tree index that is split into a plurality of subindexes and stores the subindexes in a two-dimensional array position referenced in a first dimension by values determined by applying a predetermined function to the values to be registered and referenced in a second dimension by values determined by applying a predetermined function to the keys;

wherein a word is used as a key and one document containing the word is used as a value;

wherein a document identification number and a word identification number are assigned to the document and the word, respectively, to uniquely identify them;

wherein, as a function to apply to documents, a hash function is provided that maps the document identification number to a value indicating a position of one dimension of the two-dimensional array, and as a function to apply to words, a hash function is provided that maps the word identification number to a value indicating a position of another dimension of the two-dimensional array; and wherein a occurrence of a word in a document is registered in a corresponding subindex by using values obtained by applying the hash functions to the document identification number and the word identification number, respectively.

15. An index of a database in which sets of keys and values are registered, wherein said index is constituted by providing a B+ tree index that is split to a plurality of subindexes, and each of said subindexes is stored in a two-dimensional storage medium location determined in a first dimension by a first value obtained by applying a predetermined function to a value and determined in a second dimension by a second value obtained by applying a predetermined function to a key;

wherein a word is used as the key and one document containing the word is used as the value;

wherein a document identification number and a word identification number are assigned to each document and word, respectively, to uniquely identify them;

wherein, as a function to apply to documents, a hash function is provided that maps the document identification number to a value indicating a position of one dimension of a two-dimensional array, and as a function to apply to words, a hash function is provided that maps the word identification number to a value indicating a position of another dimension of the two-dimensional array; and wherein an occurrence of a word in a document is registered in a corresponding subindex by using values obtained by applying the hash functions to the document identification number and the word identification number, respectively.

\* \* \* \* \*